United States Patent
Pathapati et al.

(10) Patent No.: US 12,537,871 B2
(45) Date of Patent: *Jan. 27, 2026

(54) POLICY ENFORCEMENT AND VISIBILITY BY OPEN APIS

(71) Applicant: Netskope, Inc., Santa Clara, CA (US)

(72) Inventors: Venkataswamy Pathapati, Koduru Mandal (IN); Muhammed Shafeek, Bangalore (IN); Krishna Narayanaswamy, Saratoga, CA (US)

(73) Assignee: Netskope, Inc., Santa Clara, CA (US)

( * ) Notice: Subject to any disclaimer, the term of this patent is extended or adjusted under 35 U.S.C. 154(b) by 144 days.

This patent is subject to a terminal disclaimer.

(21) Appl. No.: 17/986,812

(22) Filed: Nov. 14, 2022

(65) Prior Publication Data

US 2023/0128002 A1 Apr. 27, 2023

Related U.S. Application Data

(63) Continuation of application No. 17/559,993, filed on Dec. 22, 2021, now Pat. No. 11,503,038.

(30) Foreign Application Priority Data

Oct. 27, 2021 (IN) .............................. 202141049114

(51) Int. Cl.
*H04L 67/1021* (2022.01)
*G06F 11/30* (2006.01)
(Continued)

(52) U.S. Cl.
CPC ...... *H04L 67/1021* (2013.01); *G06F 11/3089* (2013.01); *G06F 16/9027* (2019.01);
(Continued)

(58) Field of Classification Search
CPC ..... H04L 63/105; H04L 63/029; H04L 67/01; H04L 63/0272; H04L 9/30; H04L 9/0894;
(Continued)

(56) References Cited

U.S. PATENT DOCUMENTS 5,440,723 A 8/1995 Arnold et al.
6,513,122 B1 1/2003 Magdych et al.
(Continued)

FOREIGN PATENT DOCUMENTS

EP 1063833 A2 12/2000
WO 2005069823 A2 8/2005
(Continued)

OTHER PUBLICATIONS

Clark et al., Designing a SASE Architecture Netskope Special Edition, 2021, John Wiley & Sons, Inc., 66 pgs.
(Continued)

*Primary Examiner* — Kyung H Shin
(74) *Attorney, Agent, or Firm* — Haynes Beffel & Wolfeld LLP; Ernest J Beffel, Jr.; Jason Liao

(57) ABSTRACT

The disclosed technology teaches keeping up with the deployment of APIs, so that Secure Access Service Edge (SASE) protection is afforded, parsing an OpenAPI specification for an API family, for identifying overall attributes of the API family. The technology includes parsing an OpenAPI specification to extract usable attributes of API resources, which are useful for building a connector, including extracting attributes of core activities that trigger protective actions, and applying a connection creator that performs actions including accessing a template for creating connector rules and using the extracted attributes with the template to produce the connector rules, thereby automating generation of connectors. Using the connector rules for the SASE protection is also taught.

20 Claims, 19 Drawing Sheets

(51) Int. Cl.
  *G06F 16/901* (2019.01)
  *H04L 9/40* (2022.01)
  *H04L 43/028* (2022.01)
  *H04L 67/01* (2022.01)
  *H04L 67/133* (2022.01)
  *G06F 9/54* (2006.01)

(52) U.S. Cl.
  CPC ........ *H04L 43/028* (2013.01); *H04L 63/0281* (2013.01); *H04L 63/029* (2013.01); *H04L 63/0853* (2013.01); *H04L 63/105* (2013.01); *H04L 63/1433* (2013.01); *H04L 63/20* (2013.01); *H04L 67/01* (2022.05); *H04L 67/133* (2022.05); *G06F 9/542* (2013.01)

(58) Field of Classification Search
  CPC ..... H04L 9/3263; H04L 9/006; H04L 63/102; H04L 63/0823; H04L 9/14; H04L 63/0876; H04L 67/1021; H04L 63/20; H04L 63/0853; H04L 63/0281; H04L 63/1433; H04L 63/10; G06F 9/547; G06F 9/468; G06F 11/302; G06F 11/3089; G06F 9/542; G06F 11/3072; G06F 16/9027; G06F 8/10; G06F 16/903; G06F 8/74; G06F 9/54
  See application file for complete search history.

(56) References Cited

U.S. PATENT DOCUMENTS

| | | |
|---|---|---|
| 6,622,248 B1 | 9/2003 | Hirai |
| 6,959,326 B1 | 10/2005 | Day et al. |
| 7,027,975 B1 | 4/2006 | Pazandak et al. |
| 7,080,408 B1 | 7/2006 | Pak et al. |
| 7,298,864 B2 | 11/2007 | Jones |
| 7,376,719 B1 | 5/2008 | Shafer et al. |
| 7,735,116 B1 | 6/2010 | Gauvin |
| 7,958,164 B2 | 6/2011 | Ivanov et al. |
| 7,966,654 B2 | 6/2011 | Crawford |
| 8,000,329 B2 | 8/2011 | Fendick et al. |
| 8,296,178 B2 | 10/2012 | Hudis et al. |
| 8,793,151 B2 | 7/2014 | DelZoppo et al. |
| 8,839,417 B1 | 9/2014 | Jordan |
| 9,069,992 B1 | 6/2015 | Vaikar et al. |
| 9,137,131 B1 | 9/2015 | Sarukkai et al. |
| 9,197,601 B2 | 11/2015 | Pasdar |
| 9,225,734 B1 | 12/2015 | Hastings |
| 9,231,968 B2 | 1/2016 | Fang et al. |
| 9,280,678 B2 | 3/2016 | Redberg |
| 9,516,053 B1 | 12/2016 | Muddu et al. |
| 9,811,662 B2 | 11/2017 | Sharpe et al. |
| 10,084,825 B1 | 9/2018 | Xu |
| 10,235,533 B1 | 3/2019 | Thoren et al. |
| 10,237,282 B2 | 3/2019 | Nelson et al. |
| 10,334,442 B2 | 6/2019 | Vaughn et al. |
| 10,382,468 B2 | 8/2019 | Dods |
| 10,484,334 B1 | 11/2019 | Lee et al. |
| 10,747,505 B1* | 8/2020 | Lester ................. G06F 16/9027 |
| 10,757,090 B2 | 8/2020 | Kahol et al. |
| 10,826,941 B2 | 11/2020 | Jain et al. |
| 10,855,671 B2 | 12/2020 | Kahol et al. |
| 11,032,301 B2 | 6/2021 | Mandrychenko et al. |
| 11,036,856 B2 | 6/2021 | Graun et al. |
| 11,281,775 B2 | 3/2022 | Burdett et al. |
| 2002/0099666 A1 | 7/2002 | Dryer et al. |
| 2003/0055994 A1 | 3/2003 | Herrmann et al. |
| 2003/0063321 A1 | 4/2003 | Inoue et al. |
| 2003/0172292 A1 | 9/2003 | Judge |
| 2003/0204632 A1 | 10/2003 | Willebeek-LeMair et al. |
| 2004/0015719 A1 | 1/2004 | Lee et al. |
| 2005/0010593 A1 | 1/2005 | Fellenstein et al. |
| 2005/0271246 A1 | 12/2005 | Sharma et al. |
| 2006/0156401 A1 | 7/2006 | Newstadt et al. |
| 2007/0204018 A1 | 8/2007 | Chandra et al. |
| 2007/0237147 A1 | 10/2007 | Quinn et al. |
| 2008/0069480 A1 | 3/2008 | Aarabi et al. |
| 2008/0134332 A1 | 6/2008 | Keohane et al. |
| 2008/0189778 A1 | 8/2008 | Rowley |
| 2009/0144818 A1 | 6/2009 | Kumar et al. |
| 2009/0249470 A1 | 10/2009 | Litvin et al. |
| 2009/0300351 A1 | 12/2009 | Lei et al. |
| 2010/0017436 A1 | 1/2010 | Wolge |
| 2010/0131616 A1 | 5/2010 | Walter et al. |
| 2011/0119481 A1 | 5/2011 | Auradkar et al. |
| 2011/0145594 A1 | 6/2011 | Jho et al. |
| 2012/0008786 A1 | 1/2012 | Cronk et al. |
| 2012/0106366 A1 | 5/2012 | Gauvin |
| 2012/0159503 A1 | 6/2012 | Shafiee et al. |
| 2012/0278872 A1 | 11/2012 | Woelfel et al. |
| 2012/0278896 A1 | 11/2012 | Fang et al. |
| 2013/0159694 A1 | 6/2013 | Chiueh et al. |
| 2013/0287121 A1 | 10/2013 | Lee et al. |
| 2013/0298190 A1 | 11/2013 | Sikka et al. |
| 2013/0347085 A1 | 12/2013 | Hawthorn et al. |
| 2014/0013112 A1 | 1/2014 | Cidon et al. |
| 2014/0068030 A1 | 3/2014 | Chambers et al. |
| 2014/0068705 A1 | 3/2014 | Chambers et al. |
| 2014/0075032 A1 | 3/2014 | Vasudevan et al. |
| 2014/0259093 A1 | 9/2014 | Narayanaswamy et al. |
| 2014/0280919 A1 | 9/2014 | Lakes et al. |
| 2014/0282843 A1 | 9/2014 | Buruganahalli et al. |
| 2014/0359282 A1 | 12/2014 | Shikfa et al. |
| 2014/0366079 A1 | 12/2014 | Pasdar |
| 2015/0100357 A1 | 4/2015 | Seese et al. |
| 2015/0200924 A1 | 7/2015 | Parla et al. |
| 2015/0319156 A1 | 11/2015 | Guccione et al. |
| 2016/0065627 A1 | 3/2016 | Pearl et al. |
| 2016/0087970 A1 | 3/2016 | Kahol et al. |
| 2016/0196324 A1 | 7/2016 | Haviv et al. |
| 2016/0226888 A1 | 8/2016 | Born |
| 2016/0275303 A1 | 9/2016 | Narayanaswamy et al. |
| 2016/0323318 A1 | 11/2016 | Terrill et al. |
| 2016/0350145 A1 | 12/2016 | Botzer et al. |
| 2017/0048285 A1 | 2/2017 | Pearl et al. |
| 2017/0064005 A1 | 3/2017 | Lee |
| 2017/0093917 A1 | 3/2017 | Chandra et al. |
| 2017/0171020 A1 | 6/2017 | Wei et al. |
| 2017/0250951 A1 | 8/2017 | Wang et al. |
| 2017/0264640 A1 | 9/2017 | Narayanaswamy et al. |
| 2018/0027006 A1 | 1/2018 | Zimmermann et al. |
| 2018/0316682 A1 | 11/2018 | Frantz, III et al. |
| 2019/0034295 A1 | 1/2019 | Bourgeois et al. |
| 2019/0132410 A1 | 5/2019 | Kuzkin et al. |
| 2019/0196890 A1 | 6/2019 | Bucchi et al. |
| 2019/0295011 A1 | 9/2019 | Shi et al. |
| 2020/0050686 A1 | 2/2020 | Kamalapuram et al. |
| 2021/0314342 A1* | 10/2021 | Oberg ..................... H04L 63/20 |
| 2021/0336934 A1* | 10/2021 | Deshmukh .......... H04L 67/1021 |

FOREIGN PATENT DOCUMENTS

| | | |
|---|---|---|
| WO | 2009094654 A1 | 7/2009 |
| WO | 2014093613 A1 | 6/2014 |
| WO | 2019226189 A1 | 11/2019 |

OTHER PUBLICATIONS

Netskope, "Data Loss Prevention and Monitoring in the Cloud", Nov. 2014, 18 pages.
"Cloud Data Loss Prevention Reference Architecture", Netskope, Sep. 2015, WP-88-1, 2 pages.
"Repave the Cloud-Data Breach Collision Course," netSkope, Inc., 2014, 6 pgs.
Netskope, "The 5 Steps to Cloud Confidence," netSkope Inc., 2014, 11 pgs.
"Netskope Active Cloud DLP", netSkope, Inc., 2015, 5 pages, downloaded from http://mtechpro.com.au/wp-content/uploads/445271-netskope-activ.pdf.
U.S. Appl. No. 17/559,993—Office Action dated Mar. 10, 2022, 12 pages.

(56) References Cited

OTHER PUBLICATIONS

Screen capture of https://www.bitglass.com/blog/how-topatent-a-phishing-attack, dated Oct. 1, 2015.
Jill Gemmill et al., Cross-domain authorization for feder-ated virtual organizations using the myVocs collaboration environment, 21 Concurrency & Computation: Prac-Tice and Experience 509 (2008).
PCT/US2018/051031—International Search Report and Written Opinion dated Jan. 29, 2019, 14 pages.
U.S. Appl. No. 15/986,732—Pre Interview First Office Action dated Oct. 19, 2019, 9 pages.
JP 2019-537825—Notice of Allowance dated Jul. 7, 2020, 5 pages.
EP 18789283.1—Decision to Grant dated Aug. 13, 2020, 2 pages.
EP 18789283.1 Response to First Office Action, dated Jan. 31, 2020, 16 pages.
EP 18789283.1—First Office Action dated Oct. 8, 2019, 5 pages.
"50 Successful Blogs in Every Topic Imaginable", Sparrringmind.com, 34 pages, (downloaded Mar. 26, 2002 from https://web.archive.org/web/20181204131618/https://www.sparringmind.com/successful-blogs].
EP 18789283.1—Notice of Allowance dated Mar. 20, 2020, 9 pages.
U.S. Appl. No. 15/986,732, filed May 22, 2018, U.S. Appl. No. 11,064,013, Jul. 13, 2019, Granted.
U.S. Appl. No. 16/438,374, filed Jun. 11, 2019, U.S. Appl. No. 11,064,016, Jul. 13, 2019, Granted.
U.S. Appl. No. 17/373,643, filed Jul. 12, 2021, US-2021-0344746-A1, Nov. 4, 2021, Pending.
PCT/US2018/051031, Sep. 14, 2018, WO2019/226189, Nov. 28, 2019.
Martin, Victoria "Cooperative Security Fabric," The Fortinet Cookbook, Jun. 8, 2016, 6 pgs., archived Jul. 28, 2016 at https://web.archive.org/web/20160728170025/http://cookbook.fortinet.com/cooperative-security-fabric-54.
Huckaby, Jeff "Ending Clear Text Protocols," Rackaid.com, Dec. 9, 2008, 3 pgs.
Newton, Harry "fabric," Newton's Telecom Dictionary, 30th Updated, Expanded, Anniversary Edition, 2016, 3 pgs.
Fortinet, "Fortinet Security Fabric Earns 100% Detection Scores Across Several Attack Vectors in NSS Labs' Latest Breach Detection Group Test [press release]", Aug. 2, 2016, 4 pgs, available at https://www.fortinet.com/de/corporate/about-us/newsroom/press-releases/2016/security-fabric-earns-100-percent-breach-detection-scores-nss-labs.
Fortinet, "Fortinet Security Fabric Named 2016 CRN Network Security Product of the Year [press release]", Dec. 5, 2016, 4 pgs, available at https://www.fortinet.com/corporate/about-us/newsroom/press-releases/2016/fortinet-security-fabric-named-2016-crn-network-security-product.
McCullagh, Declan, "How safe is instant messaging? A security and privacy survey," CNET, Jun. 9, 2008, 14 pgs.
Beck et al., "IBM and Cisco: Together for a World Class Data Center," IBM Redbooks, Jul. 2013, 654 pgs.
Martin, Victoria "Installing internal FortiGates and enabling a security fabric," The Fortinet Cookbook, Jun. 8, 2016, 11 pgs, archived Aug. 28, 2016 at https://web.archive.org/web/20160828235831/http://cookbook.fortinet.com/installing-isfw-fortigate-enabling-csf-54/.
Zetter, Kim, "Revealed: The Internet's Biggest Security Hole," Wired, Aug. 26, 2008, 13 pgs.
Adya et al., "Farsite: Federated, available, and reliable storage for an incompletely trusted environment," SIGOPS Oper. Syst. Rev. 36, SI, Dec. 2002, pp. 1-14.
Agrawal et al., "Order preserving encryption for numeric data," In Proceedings of the 2004 ACM SIGMOD international conference on Management of data, Jun. 2004, pp. 563-574.
Balakrishnan et al., "A layered naming architecture for the Internet," ACM SIGCOMM Computer Communication Review, 34(4), 2004, pp. 343-352.
Downing et al., Naming Dictionary of Computer and Internet Terms, (11th Ed.) Barron's, 2013, 6 pgs.
Downing et al., Dictionary of Computer and Internet Terms, (10th Ed.) Barron's, 2009, 4 pgs.
Zoho Mail, "Email Protocols: What they are & their different types," 2006, 7 pgs. available at https://www.zoho.com/mail/glossary/email-protocols.html#:~: text=mode of communication.-,What are the different email protocols%3F, and also has defined functions.
Niit, Special Edition Using Storage Area Networks, Que, 2002, 6 pgs.
Chapple, Mike, "Firewall redundancy: Deployment scenarios and benefits," TechTarget, 2005, 5 pgs. available at https://www.techtarget.com/searchsecurity/tip/Firewall-redundancy-Deployment-scenarios-and-benefits?Offer=abt_pubpro_AI-Insider.
Fortinet, FortiGate—3600 User Manual (vol. 1, Version 2.50 MR2) Sep. 5, 2003, 329 pgs.
Fortinet, FortiGate SOHO and SMB Configuration Example, (Version 3.0 MR5), Aug. 24, 2007, 54 pgs.
Fortinet, FortiSandbox—Administration Guide, (Version 2.3.2), Nov. 9, 2016, 191 pgs.
Fortinet, FortiSandbox Administration Guide, (Version 4.2.4) Jun. 12, 2023, 245 pgs. available at https://fortinetweb.s3.amazonaws.com/docs.fortinet.com/v2/attachments/fba32b46-b7c0-11ed-8e6d-fa163e15d75b/FortiSandbox-4.2.4-Administration_Guide.pdf.
Fortinet, FortiOS—Administration Guide, (Versions 6.4.0), Jun. 3, 2021, 1638 pgs.
Heady et al., "The Architecture of a Network Level Intrusion Detection System," University of New Mexico, Aug. 15, 1990, 21 pgs.
Kephart et al., "Fighting Computer Viruses," Scientific American (vol. 277, No. 5) Nov. 1997, pp. 88-93.
Wang, L., Chapter 5: Cooperative Security in D2D Communications, "Physical Layer Security in Wireless Cooperative Networks," 41 pgs. first online on Sep. 1, 2017 at https://link.springer.com/chapter/10.1007/978-3-319-61863-0_5.
Lee et al., "A Data Mining Framework for Building Intrusion Detection Models," Columbia University, n.d. 13 pgs.
Merriam-Webster Dictionary, 2004, 5 pgs.
Microsoft Computer Dictionary, (5th Ed.), Microsoft Press, 2002, 8 pgs.
Microsoft Computer Dictionary, (4th Ed.), Microsoft Press, 1999, 5 pgs.
Mika et al., "Metadata Statistics for a Large Web Corpus," LDOW2012, Apr. 16, 2012, 6 pgs.
Oxford Dictionary of Computing (6th Ed.), 2008, 5 pgs.
Paxson, Vern, "Bro: a System for Detecting Network Intruders in Real-Time," Proceedings of the 7th USENIX Security Symposium, Jan. 1998, 22 pgs.
Fortinet Inc., U.S. Appl. No. 62/503,252, "Building a Cooperative Security Fabric of Hierarchically Interconnected Network Security Devices." n.d., 87 pgs.
Song et al., "Practical techniques for searches on encrypted data," In Proceeding 2000 IEEE symposium on security and privacy. S&P 2000, May 2000, pp. 44-55.
Dean, Tamara, Guide to Telecommunications Technology, Course Technology, 2003, 5 pgs.
U.S. Appl. No. 60/520,577, "Device, System, and Method for Defending a Computer Network," Nov. 17, 2003, 21 pgs.
U.S. Appl. No. 60/552,457, "Fortinet Security Update Technology," Mar. 2004, 6 pgs.
Tittel, Ed, Unified Threat Management For Dummies, John Wiley & Sons, Inc., 2012, 76 pgs.
Fortinet, FortiOS Handbook: UTM Guide (Version 2), Oct. 15, 2010, 188 pgs.
Full Definition of Security, Wayback Machine Archive of Merriam-Webster on Nov. 17, 2016, 1 pg.
Definition of Cooperative, Wayback Machine Archive of Merriam-Webster on Nov. 26, 2016, 1 pg.
Pfaffenberger, Bryan, Webster's New World Computer Dictionary, (10th Ed.), 2003, 5 pgs.

\* cited by examiner

FIG. 4

```
▼ { } JSON                              ▼ [ ] JSON  508
  ▼ [ ] activities_dictionary             ▪ 0 : "Path"
502     ▪ 0 : "Create"                    ▪ 1 : "SourceMap"
505     ▪ 1 : "Register"                  ▪ 2 : "MinifiedJavaScript"
        ▪ 2 : "View"                      ▪ 3 : "File"
        ▪ 3 : "Edit"                      ▪ 4 : "Method"
        ▪ 4 : "Delete"                    ▪ 5 : "glossary"
                                          ▪ 6 : "profile_picture"
▼ { } JSON                                ▪ 7 : "comment"
545   ▪ app_name : "Amazon EKS"           ▪ 8 : "glossaries"
      ▪ app_cat : "Amazon"                ▪ 9 : "styleguides"
                                          ▪ 10 : "grant_type"
▼ [ ] JSON                                ▪ 11 : "scope"
555   ▪ 0 : "startTimeInSeconds"          ▪ 12 : "profile_picture"
      ▪ 1 : "endTimeInSeconds"            ▪ 13 : "archive_file"
      ▪ 2 : "quality"
      ▪ 3 : "intervalInSeconds"
      ▪ 4 : "type"
```

```
▼ { } JSON
  ▼ [ ] domain_dictionary
502   ▪ 0 : "eks.eu-central-1.amazonaws.com"
      ▪ 1 : "eks.eu-west-1.amazonaws.com"
      ▪ 2 : "eks.eu-south-1.amazonaws.com"
      ▪ 3 : "eks.ap-northeast-2.amazonaws.com"
      ▪ 4 : "eks.ap-east-1.amazonaws.com"
      ▪ 5 : "eks.me-south-1.amazonaws.com"
      ▪ 6 : "eks.us-gov-east-1.amazonaws.com"
      ▪ 7 : "eks.sa-east-1.amazonaws.com"
552   ▪ 8 : "eks.us-east-1.amazonaws.com"
      ▪ 9 : "eks.af-south-1.amazonaws.com"
      ▪ 10 : "eks.eu-west-3.amazonaws.com"
      ▪ 11 : "eks.us-west-1.amazonaws.com"
      ▪ 12 : "eks.ap-southeast-1.amazonaws.com"
      ▪ 13 : "eks.ca-central-1.amazonaws.com"
      ▪ 14 : "eks.eu-north-1.amazonaws.com"
      ▪ 15 : "eks.ap-northeast-3.amazonaws.com"
      ▪ 16 : "eks.eu-west-2.amazonaws.com"
572   ▪ 17 : "eks.us-east-2.amazonaws.com"
      ▪ 18 : "eks.ap-southeast-2.amazonaws.com"
      ▪ 19 : "eks.ap-south-1.amazonaws.com"
      ▪ 20 : "eks.cn-north-1.amazonaws.com.cn"
      ▪ 21 : "eks.cn-northwest-1.amazonaws.com.cn"
      ▪ 22 : "eks.us-west-2.amazonaws.com"
      ▪ 23 : "eks.us-gov-west-1.amazonaws.com"
      ▪ 24 : "eks.ap-northeast-1.amazonaws.com"
```

602 [ ] operation_id
- 0 : "AssociateEncryptionConfig"
- 1 : "AssociateIdentityProviderConfig"
- 2 : "CreateAddon"
- 3 : "ListAddons"
- 4 : "CreateCluster"
- 5 : "ListClusters"
- 6 : "CreateFargateProfile"
- 7 : "ListFargateProfiles"
- 8 : "CreateNodegroup"
- 9 : "ListNodegroups"
- 10 : "DeleteAddon"
- 11 : "DescribeAddon"
- 12 : "DeleteCluster"
- 13 : "DescribeCluster"
- 14 : "DeleteFargateProfile"
- 15 : "DescribeFargateProfile"
- 16 : "DeleteNodegroup"
- 17 : "DescribeNodegroup"
- 18 : "DeregisterCluster"
- 19 : "DescribeAddonVersions"
- 20 : "DescribeIdentityProviderConfig"
- 21 : "DescribeUpdate"
- 22 : "DisassociateIdentityProviderConfig"
- 23 : "ListIdentityProviderConfigs"

606 [ ] JSON
- 0 : "associateDefaultSecurityGroup"
- 1 : "bandwidthThrottling"
- 2 : "createPublicIP"
- 3 : "dataPlaneRouting"
- 4 : "defaultLargeStagingDiskType"
- 5 : "ebsEncryption"
- 6 : "replicationServerInstanceType"
- 7 : "replicationServersSecurityGroupsIDs"
- 8 : "stagingAreaSubnetId"
- 9 : "stagingAreaTags"
- 10 : "useDedicatedReplicationServer"

656 [ ] JSON
- { } 0
  - Action : "StartMigration"
- { } 1
  - Version : "Version"
- { } 2
  - ReplicationGroupId : "ReplicationGroupId"
- { } 3
  - CustomerNodeEndpointList : "CustomerNodeEndpointList"

```
<app_name ="{{ app_name_dictionary.app_name }}" >
    <ui>
        <name> {{ app_name_dictionary.app_name }} </name>
        <description> This is {{ app_name_dictionary.app_name }}</description>
    </ui>
    <id>
        {%- for domain_name in domain_dictionary['domain'] %}
        <match field="host" mtype="dns" rhs="{{domain_name}}" />
        {%- endfor %}
    </id>
    <vars>
742     <var name="data_center" scope="flow-context" vtype="string">
            <ui>
                <name> data_center variable</name>
                <description> data_center variable </description>
            </ui>
        </var>
        <var name="object_type" scope="flow-context" vtype="string">
            <ui>
                <name>object_type variable</name>
                <description>object_type variable </description>
            </ui>
        </var>
        <var name="synthetic_key" scope="flow-context" vtype="string">
            <ui>
                <name>synthetic_key variable</name>
                <description>synthetic_key variable </description>
            </ui>
        </var>
        <var name="instance_id" scope="flow-context" vtype="string">
            <ui>
                <name>instance_id variable</name>
                <description>instance_id variable </description>
            </ui>
        </var>
```

FIG. 7

```
<var name="api_action" scope="flow-context" vtype="string">
    <ui>
        <name>api_action variable</name>
        <description>api_action variable </description>
    </ui>
</var>
</vars>
<triggers>
{%- for values in app_activity_dictionary %}
    <trigger log="y" name="{{ values }}">
        <external>
            <action name="nspolicy_lookup" />
        </external>
        <ui>
            <name>{{ values }}</name>
            <description> This is a {{ values }} activity </description>
        </ui>
    </trigger>
{%- endfor %}
</triggers>
{% for resource_name in parent_dict %}
<resource name="{{ resource_name }}" path="{{parent_dict[resource]['uri_path']}}" >
    <id>
    {%- if (parent_dict[resource]['uri_id_dict']) | length %}
    <and>
    {%- for uri_key, uri_value in parent_dict[resource]['uri_id_dict'].items() %}
        <match mtype="kvp" field="uriparam-key" key="{{ uri_key }}" rhs="{{ uri_value }}" />
    {%- endfor %}
    </and>
    {%- elif (parent_dict[resource]['header_id_dict']) | length %}
    <and>
    {%- for header_key, header_value in parent_dict[resource]['header_id_dict'].items() %}
        <match field="req-field" key="{{ header_key }}" mtype="kvp" rhs="{{ header_value }}" />
    {%- endfor %}
    </and>
```

```
{%- elif parent_dict[resource]['uri_subpath'] | length %}
  <and>
    <match field="uripath" mtype="exact-depth" depth="
{{parent_dict[resource]['uri_depth']}}"/>
    <match field="uripath" mtype="strstr-ncase" rhs="
{{parent_dict[resource]['uri_subpath']}}"/>
  </and>
{%- else %}
  <and>
    <match field="uripath" mtype="exact-depth" depth="
{{parent_dict[resource]['uri_depth']}}" />
  </and>
{%- endif %}
</id>
```

942 `<request>`

```
{%- if (parent_dict[resource]['json_data']) | length %}
<info>
  <field encodingtype="JSON" name="post-data" parsertype="jsonstream" />
</info>
{%- endif -%}
{%- for actions in parent_dict[resource] -%}
{%- if actions != 'uri_path' and actions != 'uri_depth' and actions != 'json_data' and
actions != 'uri_id_dict' and actions != 'header_id_dict' and actions != 'connector_activity_name' and
actions != 'mime_data' and actions != 'uri_subpath' -%}
{%- set connector_activity = parent_dict[resource]
[actions]['connector_activity_name'] %}
  <actions>
    <match field="method" key="httpmethods" mtype="nsdef"
rhs="{{parent_dict[resource][actions]['method']}}"/>
{%- if (parent_dict[resource][actions]['uriparam_list']) |length -%}
    {%- for uriparam in parent_dict[resource][actions]['uriparam_list'] %}
      {%- for uriparam_key, uriparam_value in uriparam.items() %}
      <match mtype="kvp" field="uriparam-key" key="{{uriparam_key}}"
rhs="{{uriparam_value}}" />
      {%- endfor %}
    {%- endfor %}
{%- endif %}
```

FIG. 9

```
{%- if (parent_dict[resource][actions] ['postparam_list']|length -%}
  {%- for postparam in parent_dict[resource] [actions]['postparam_list'] %}
    {%- for postparam_key,postparam_value in postparam.items() %}
      <match field="postdata-key" key="{{postparam_key}}" mtype="kvp" rhs="{{postparam_value}}"/>
    {%- endfor %}
  {%- endfor %}
{%- endif %}
{%- if (parent_dict[resource][actions]['header_list'])|length -%}
  {%- for header in parent_dict[resource][actions] ['header_list'] %}
    {%- for header_key, header_value in header.items() %}
      <match field="req-field" key="{{header_key}}" mtype="kvp" rhs="{{header_value}}" />
    {%- endfor %}
  {%- endfor %}
{%- endif %}
{%- if (parent_dict[resource][actions]['json_list'])|length %}
  {%- for json_key in parent_dict[resource] [actions]['json_list'] %}
    <match field="post-data" mtype="struct-search-keys" searchkeys="{ {{-json_key-}} }" keycheck="1" />
  {%- endfor %}
{%- endif %}
{%- if (parent_dict[resource][actions]['mime_list'])|length %}
  {%- for mime_key in parent_dict[resource][actions]['mime_list'] %}
    <match field="post-data" key="{{mime_key}}" mtype="mime-kvp" rhs="{{mime_key}}" />
  {%- endfor %}
{%- endif %}
</and>
<assign lhs="api_action" order="1" rhs="{{parent_dict [resource] [actions]['api_activity_name']}}" type="value" />
<trigger order="2" name="{{parent_dict[resource][actions]['connector_activity_name']}}">
  <external>
    <action name="{{parent_dict[resource][actions] ['policy_type']}}" />
  </external>
</trigger>
```

```
1022  <var name="instance_id" />
1032  <var name="data_center" />
      <var name="api_command" />
</trigger>
      {%-- endif %}
<assign lhs="temp_api" order="4"
rhs="{{temp_dict[parent_dict[resource][actions][`connector_activity_name`]]}}" type=" value" />
      </actions>
    </request>
</app>
```

FIG. 10B

```
<app name ="Amazon Elastic Kubernetes Service" >
    <ui>
        <name> Amazon Elastic Kubernetes Service </name>
        <description> This is Amazon Elastic Kubernetes Service</description>
    </ui>
    <feature>from-user-constraint-profile-enabled</feature>
    <appgroups><appgroup name="Amazon" /> </appgroups>
    <id>
1134    <match field="host" mtype="dns" rhs="eks.us-east-1.amazonaws.com" />
    </id>
    <vars>
        <var name="temp_api" scope="flow-context" vtype="int">
            <ui>
                <name>temp_api variable</name>
                <description> temp_api variable </description>
            </ui>
        </var>
        <var name="access_key" scope="flow-context" vtype="string">
            <ui>
                <name> access_key variable</name>
                <description> access_key variable </description>
            </ui>
        </var>
        <var name="data_center" scope="flow-context" vtype="string">
            <ui>
                <name> data_center variable</name>
                <description> data_center variable </description>
            </ui>
        </var>
```

FIG. 11

```
<var name="instance_id" scope="flow-context" vtype="string">
    <ui>
        <name>instance_id variable</name>
        <description>instance_id variable </description>
    </ui>
</var>
<var name="api_command" scope="flow-context" vtype="string">
    <ui>
        <name>api_command variable</name>
        <description>api_command variable </description>
    </ui>
</var>
</vars>
<triggers>
    <trigger log="y" name="Dummy">
        <ui>
            <name>dummy trigger</name>
            <description>dummy trigger</description>
        </ui>
    </trigger>
    <trigger log="y" name="Create">
        <external>
            <action name="nspolicy_lookup" />
        </external>
        <ui>
            <name>Create</name>
            <description> This is a Create activity </description>
        </ui>
    </trigger>
</triggers>
```

```xml
<resource name="amazon_eks_api_cli_native_resource_4" path="/clusters" >
    <id>
        <and>
            <match field="uripath" mtype="exact-depth" depth="1" />
        </and>
    </id>
    <init>
        <assign field="host" lhs="data_center" normalize="strtokenize" order="1" type="field" norm-delim=".amazonaws.com" normtoken="norm-lhs"/>
        <assign lhs="data_center" norm-delim=".", norm-token="normrhs" normalize="tokens-normalize" order="2" rhs="data_center" type="variable"/>
        <assign type="field" field="authorization" lhs="access_key" norm-delim="" norm-token="norm-rhs" normalize="str-tokenize" order="3"/>
        <assign lhs="access_key" norm-delim="/" norm-token="normlhs" normalize="str-tokenize" order="4" rhs="access_key" type="variable"/>
    </init>
    <request>
        <info>
            <field encodingtype="JSON" name="post-data" parsertype="jsonstream" />
        </info>
        <actions>
        </actions>
        <and>
            <match field="method" key="httpmethods" mtype="nsdef" rhs="post"/>
            searchkeys="{name}" keycheck="1" />
            <match field="post-data" mtype="struct-search-keys"
            searchkeys="{roleArn}" keycheck="1" />                                    1372
            <match field="post-data" mtype="struct-search-keys"                       1374
            searchkeys="{resourcesVpcConfig}" keycheck="1" />
        </and>
        <assign lhs="api_command" order="1" rhs="CreateCluster" type="value" />     1376
        <trigger name="Dummy" order="2">
            <var name="access_key"/>
            <var name="instance_id"/>
            <dict action="lookup" dbtype="accesskey-db" key="access_key" val="instance_id"/>
        </trigger>
</trigger>
```

FIG. 13

```xml
    <trigger order="3" name="Create">
        <external>
            <action name="nspolicy_lookup" />
        </external>
        <var name="instance_id" />
        <var name="data_center" />
        <var name="api_command" />
    </trigger>
    <assign lhs="temp_api" order="4" rhs="102" type="value"/>
    </actions>
</request>
<response>
    <actions>
        <and>
            <match lhsvar="temp_api" mtype="eq" rhs="102" />
            <match field="status" key="http_statuscode" mtype= "nsdef" rhs="ok" />
        </and>
        <and>
            <match lhsvar="temp_api" mtype="eq" rhs="102" />
            <match field="status" key="http_statuscode" mtype="nsdef" rhs="created" />
        </and>
        <assign lhs="api_command" order="2" rhs="CreateCluster" type="value" />
        <trigger order="3" name="Create">
            <external>
                <action name="send_event" />
            </external>
            <var name="instance_id" />
            <var name="data_center" />
            <var name="api_command" />
        </trigger>
        <assign order="4" type="reset-var" lhs="temp_api" />
    </actions>
</response>
</resource>
</app>
```

Real - time Protection Policy 1604

Activites and action availabe are dependent on the type of profile and applications you selected Policies
- SSL Decryption
- Real-time Protection
- Api Data Protection
- Security Posture
- Behavior Analytics
- Encryption
- PROFILES
- DLP
- Threat Protection
- Web
- HTTP Header
- IPS
- Connected App/Plugin
- Domain
- User
- File
- Constraint
- Quarantine ⸸ Source — User▽ All Users clicks to select subset of users
ADD CRITERIA▽

→ Destination — Application ▽ ⊘
Application▽ Amazon EKS 1644    EDIT
ACTIVITIES & CONSTRAINTS
Any
ADD CRITERIA▽

⸸ Profile & Action — Action Alert ▽
ADD PROFILE▽

⊗ Set Policy 1674 — Policy Name
▷ PROFILE DESCRIPTION
▷ EMAIL NOTIFICATION

⊗ Status — ⊂⊃ Enabled
▷ POLICY SCHEDULE

POLICY ENFORCEMENT AND VISIBILITY BY OPEN APIS

PRIORITY

This application is a continuation of U.S. application Ser. No. 17/559,993, titled "Policy Enforcement and Visibility for IaaS and SaaS Open APIs," filed 22 Dec. 2021, now U.S. Pat. No. 11,503,038, issued 15 Nov. 2022. which claims priority to Indian Application No. 202141049114, filed 27 Oct. 2021.

RELATED CASES

This application is related to the following applications which are incorporated by reference for all purposes as if fully set forth herein:

U.S. application Ser. No. 16/438,374, entitled UNIVERSAL CONNECTORS FOR CLOUD DATA LOSS PREVENTION (DLP), filed Jun. 11, 2019.

U.S. application Ser. No. 15/986,732, entitled "DATA LOSS PREVENTION USING CATEGORY-DIRECTED PARSERS," filed on May 22, 2018.

INCORPORATIONS

The following materials are incorporated by reference for all purposes as if fully set forth herein:

U.S. Nonprovisional patent application Ser. No. 14/198,499, entitled "Security for Network Delivered Services", filed on Mar. 5, 2014 (now U.S. Pat. No. 9,398,102 issued on Jul. 19, 2016);

U.S. Nonprovisional patent application Ser. No. 14/835,640, entitled "Systems and Methods of Monitoring And Controlling Enterprise Information Stored On A Cloud Computing Service (CCS)", filed on Aug. 25, 2015;

U.S. Non Provisional application Ser. No. 15/368,240 entitled "Systems and Methods of Enforcing Multi-Part Policies on Data-Deficient Transactions of Cloud Computing Services", U.S. Pat. No. 10,826,940, issued Nov. 3, 2020) and U.S. Provisional Application 62/307,305 entitled "Systems and Methods of Enforcing Multi-Part Policies on Data-Deficient Transactions of Cloud Computing Services", filed Mar. 11, 2016;

"Data Loss Prevention and Monitoring in the Cloud" by Netskope, Inc.;

"The 5 Steps to Cloud Confidence" by Netskope, Inc.;

"Netskope Active Cloud DLP" by Netskope, Inc.; and

"Repave the Cloud-Data Breach Collision Course" by Netskope, Inc.

FIELD OF THE TECHNOLOGY DISCLOSED

The technology disclosed generally relates to keeping up with the deployment of APIs, so that Secure Access Service Edge (SASE) protection can be afforded.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Cybercriminals see the cloud as an effective method for subverting detection. Patterns of cyberthreats and malicious insiders change constantly. Meanwhile, sensitive data is increasingly distributed and moving to applications that are not necessarily sanctioned or properly secured.

Existing network security architectures were designed with the enterprise data center as the focal point for access needs. Digital business requirements, as well as the COVID-19 pandemic, are driving cloud and edge computing and work-from-anywhere demands, which results in more users, devices, applications, services and data being located outside of an enterprise than inside, on premises.

Enterprises utilize millions of cloud-based services via their application programming interfaces (APIs) which enable two applications to talk to each other, with users' transactions with the cloud-based services transpiring between enterprise endpoints and servers of the cloud-based services. Policies that apply to a service and policy enforcement for the APIs in the public cloud are specific to the services.

Proliferation of hundreds of thousands to millions of cloud-based services makes it difficult and time-consuming to develop service-specific parsers customized to monitor the syntax of each new cloud-based service. Additionally, as enterprise customers overhaul their legacy applications, they contend with the challenge of providing rules for parsing API traffic and enforcing security policies for the updated cloud applications.

An opportunity arises for keeping up with the deployment of APIs, enhancing Secure Access Service Edge (SASE) protection via policy enforcement and visibility for IaaS and SaaS open APIs for data loss prevention (DLP).

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 4 lists details for API data to connector dictionary for the "Amazon Elastic Kubernetes Service" (AWS) Open API example.

FIG. 5 illustrates example app dictionary and resource dictionary details.

FIG. 6 illustrates the example API data to connector dictionary for the "Amazon Elastic Kubernetes Service" (AWS) Open API example, with a snapshot of the first twenty-three entries of the operation ID dictionary for the EKS app with a JSON list of parameters and post data dictionary parameters required to identify the API activity.

FIG. 7, FIG. 8, FIG. 9, FIG. 10A and FIG. 10B list the common template for the activities, including but not limited to upload, download, delete, create.

FIG. 7 lists page one of five or the template in Jinja.
FIG. 8 lists page two of five of the template, in Jinja.
FIG. 9 lists page three of five the template, in Jinja.
FIG. 10A lists page four of five of the template, in Jinja.
FIG. 10B lists page five, the last page of the template, in Jinja.

FIG. 11, FIG. 12, FIG. 13 and FIG. 14 list the resulting connector resource for creating the cluster activity for the AWS create cluster example.

FIG. 11, FIG. 12, FIG. 13 and FIG. 14 list the resulting connector resource

FIG. 11 lists page one the resulting connector resource.
FIG. 12 lists page two the resulting connector resource.
FIG. 13 lists the third page the resulting connector resource.
FIG. 14 lists the last page of the resulting connector resource.

FIG. 15 shows an example graphical user interface (GUI) for visualization and policy setting for open API specs, using the disclosed generated connector rules for the APIs.

FIG. 16 shows the real-time protection policy UI for setting profile and action, and to set policy for the generated connector rules for the Amazon EKS example.

INCORPORATION BY REFERENCE OF FILE SUBMITTED ELECTRONICALLY WITH APPLICATION

Figure 1:
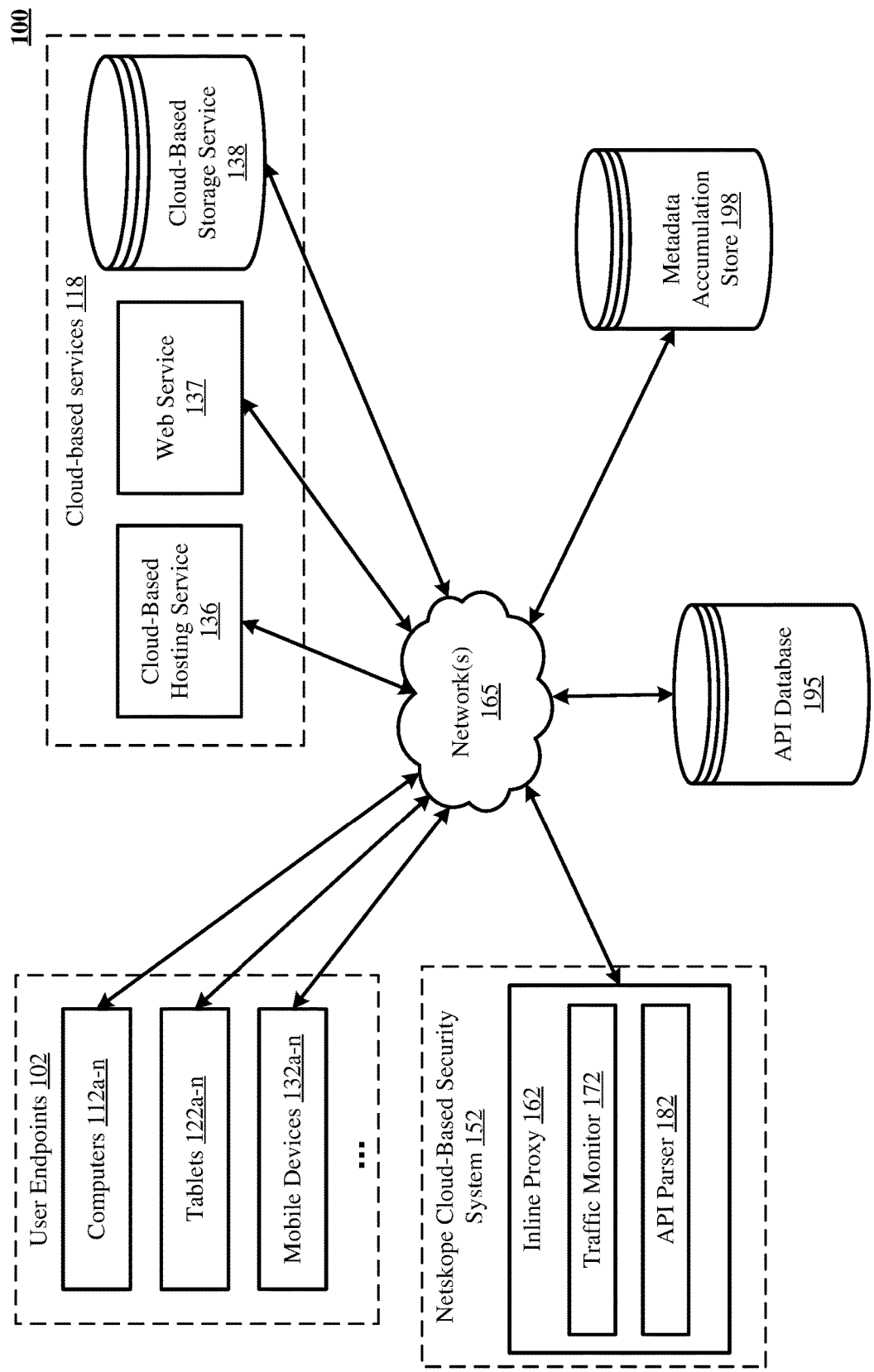
FIG. 1 illustrates an architectural level schematic of a system for keeping up with the deployment of APIs, so that Secure Access Service Edge (SASE) protection is afforded, in accordance with an implementation of the technology disclosed.

The following file is submitted with this application as Appendix A and is incorporated by reference.
File name Creation date Size
Complete Connector for Amazon EKS Open API 19 Oct. 2021 198.1 KB

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Enterprise users access multiple cloud-based services to perform a variety of activities related to products and services. In one example, a user can access a cloud-based customer relationship management (CRM) system API to generate a report of open sales opportunities. The user can download the report to an endpoint such as a computer or a mobile device. Following this, the user can share the report with other users by uploading it to a cloud-based storage service. Monitoring of these interactions is part of a data loss prevention (DLP) program.

The users' transactions with cloud-based services transpire between enterprise endpoints and servers of the cloud-based services. A proxy positioned between the endpoints and the cloud-based services monitors the transactions. The proxy intercepts and parses a message between an endpoint and a server. It determines which cloud-based service application programming interface (API) is being accessed and applies a parser (also known as a connector) to collect metadata.

Proliferation of hundreds of thousands to millions of cloud-based services makes it difficult and time-consuming to develop service-specific parsers customized to monitor the syntax of each new cloud-based service. Additionally, as enterprise customers overhaul their legacy applications, they contend with the challenge of providing rules for parsing API traffic and enforcing security policies for the updated cloud applications.

Existing approaches for providing policy enforcement for application specifications in the public cloud require a concerted reverse engineering effort to come up with rules for parsing API traffic. Logs of the ways a user uses an application are examined to come up with rules for a connector (also referred to as a parser) for each set of APIs a customer is using to automate their infrastructure. In one example, Amazon Web Services (AWS) provides more than 250 services and 9,500 CLI commands, so manual validation is not feasible.

The technology disclosed solves the technical problem of keeping up with the deployment of APIs, thus enhancing Secure Access Service Edge (SASE) protection via policy enforcement and visibility for IaaS AND SaaS open APIs for data loss prevention (DLP). The technology disclosed enables the opening of API specifications for services and extraction of attributes of the APIs, and merges extracted attributes with templates to build and deploy connectors, also referred to as deep packet inspection (DPI) proxies, that provide the SASE protection. The disclosed technology can open millions of APIs documented on the Internet automatically, and construct and add API-specific connectors for the APIs to a deep packet inspection (DPI) proxy. When customers start using those services, such as the Amazon Elastic Kubernetes Service (EKS) APIs, to automate their infrastructure, policies are automatically enforced for the new API traffic.

An example system for keeping up with the deployment of APIs, so that Secure Access Service Edge (SASE) protection is afforded, is described next.

Architecture

FIG. 1 shows an architectural level schematic of a system 100 for keeping up with the deployment of APIs, so that Secure Access Service Edge (SASE) protection is afforded. Because FIG. 1 is an architectural diagram, certain details are intentionally omitted to improve clarity of the description. The discussion of FIG. 1 will be organized as follows. First, the elements of the figure will be described, followed by their interconnections. Then, the use of the elements in the system will be described in greater detail.

FIG. 1 includes the system 100 with user endpoints 102, a cloud-based hosting service 136, a web service 137, a cloud-based storage service 138, a metadata accumulation store 198, an API database 195, a Netskope cloud-based security system 152 with inline proxy 162, and a network(s) 165. Cloud-based hosting services 136, web services 137, and cloud-based storage services 138 are collectively referred to as cloud-based services 118. User endpoints 102 such as computers 112$a$-$n$, tablets 122$a$-$n$ and mobile devices 132$a$-$n$ (such as cell phones) access and interact with data stored on the cloud-based services 118. This access and interaction are modulated by an inline proxy 162 that is interposed between the user endpoints and the cloud-based services 118. The inline proxy 162 uses a traffic monitor 172 and API (application programming interface) parser 182 to monitor traffic between the user endpoints 112 and the cloud-based services 118. The inline proxy 162 can be a cloud-based proxy or located on premise.

In a "managed device" implementation, user endpoints 102 are configured with routing agents (not shown) which ensure that requests for the cloud-based services 118 originating from the user endpoints 102 and responses to the requests are routed through the inline proxy 162 for policy enforcement. Once the user endpoints 102 are configured with the routing agents, they are under the ambit or purview of the inline proxy 162, regardless of their location (on premise or off premise).

In an "unmanaged device" implementation, certain user endpoints that are not configured with the routing agents can still be under the purview of the inline proxy 162 when they are operating in an on-premises network monitored by the inline proxy 162.

The interconnection of the elements of system 100 will now be described. The network(s) 165 couples the computers 112*a-n*, the tablets 122*a-n*, the mobile devices 132*a-n*, the cloud-based services 118, the metadata store 198, the API database 195, and the inline proxy 162 in communication with each other (indicated by solid double-arrowed lines). The communication path can be point-to-point over public and/or private networks. The communications can occur over a variety of networks, e.g., private networks, VPN, MPLS circuit, or Internet, and can use appropriate application programming interfaces (APIs) and data interchange formats, e.g., Representational State Transfer (REST), JavaScript Object Notation (JSON), Extensible Markup Language (XML), Simple Object Access Protocol (SOAP), Java Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi and WiMAX. The engines or system components of FIG. 1 are implemented by software running on varying types of computing devices. Example devices are a workstation, a server, a computing cluster, a blade server, and a server farm. Additionally, a variety of authorization and authentication techniques, such as username/password, Open Authorization (OAuth), Kerberos, SecureID, digital certificates and more, can be used to secure the communications.

The cloud-based services 118 provide functionality to users that is implemented in the cloud or on the Internet. The cloud-based services 118 can include Internet hosted services such as news websites, blogs, video streaming websites, social media websites, hosted services, cloud applications, cloud stores, cloud collaboration and messaging platforms, and/or cloud customer relationship management (CRM) platforms. Cloud-based services 118 can be accessed using a browser (e.g., via a URL) or a native application (e.g., a sync client). Categories of cloud-based services include software-as-a-service (SaaS) offerings, platform-as-a-service (PaaS) offerings, and infrastructure-as-a-service (IaaS) offerings. Enterprise applications exposed via URLs/APIs can fit in a category of service supported by a category-directed parser or a category-directed parser could be written for an enterprise applications category of service. Examples of common web services today include YouTube™, Facebook™, Twitter™, Google™, LinkedIn™ Wikipedia™, Yahoo™, Baidu™, Amazon™, MSN™, Pinterest™, Taobao™, Instagram™ Tumblr™, eBay™, Hotmail™, Reddit™ IMDb™, Netflix™, PayPal™, Imgur™, Snapchat™ Yammer™, Skype™, Slack™, HipChat™, Confluence™, TeamDrive™, Taskworld™, Chatter™, Zoho™, ProsperWorks™, Google's Gmail™, Salesforce.com™, Box™, Dropbox™ Google Apps™, Amazon AWS™, Microsoft Office365™, Workday™, Oracle on Demand™ Taleo™, Jive™, and Concur™.

The cloud-based services 118 provide functionality to the users of the organization that is implementing security policies. When a user sends a request to a cloud-based service via an endpoint 112*a*, the inline proxy 162 intercepts the request message. The inline proxy 162 queries the API database 195 to identify the cloud-based service being accessed via an application programming interface (API). In one implementation, the inline proxy 162 uses a domain name in a uniform resource locator used to access the API to identify the cloud-based service being accessed.

User identity refers to an indicator that is provided by the network cloud-based security system 152 to the client device, in the form of a token, a unique identifier such as a UUID, a public-key certificate, or the like. In some cases, the user identity can be linked to a specific user and a specific device; thus, the same individual can have a different user identity on their mobile phone vs. their computer. The user identity can be linked to an entry or corporate identity directory but is distinct from it. In one implementation, a cryptographic certificate signed by the network security is used as the user identity. In other implementations, the user identity can be solely unique to the user and be identical across devices.

Embodiments can also interoperate with single sign-on (SSO) solutions and/or corporate identity directories, e.g., Microsoft's Active Directory (AD). Such embodiments may allow policies to be defined in the directory, e.g., either at the group or user level, using custom attributes. Hosted services configured with the system are also configured to require traffic via the system. This can be done through setting IP range restrictions in the hosted service to the IP range of the system and/or integration between the system and SSO systems. For example, integration with a SSO solution can enforce client presence requirements before authorizing the sign-on. Other embodiments may use "proxy accounts" with the SaaS vendor, e.g., a dedicated account held by the system that holds the only credentials to sign into the service. In other embodiments, the client may encrypt the sign on credentials before passing the login to the hosted service, meaning that the networking security system "owns" the password.

API database 195 and metadata accumulation store 198 can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object-oriented database management systems (OODBMSs), distributed file systems (DFS), no-schema database, or any other data storing systems or computing devices. In some implementations, the gathered metadata is processed and/or normalized. In some instances, metadata includes structured data and functionality targets specific data constructs provided by cloud-based services 118. Non-structured data, such as free text, can also be provided by, and targeted back to cloud services 118.

While system 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components can be wired and/or wireless as desired. The different elements or components can be combined into single software modules and multiple software modules can run on the same processors.

Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein. The technology disclosed can be implemented in the context of any computer-implemented system including a database system or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Amazon Web Services (AWS)™, including Amazon Elasticsearch Service™ and Amazon Kinesis™, Apache Storm™ Apache Spark™, Apache Kafka™, Apache Flink™, Truviso™, IBM Info-Sphere™, Borealis™ and Yahoo! S4™.

Figure 2:
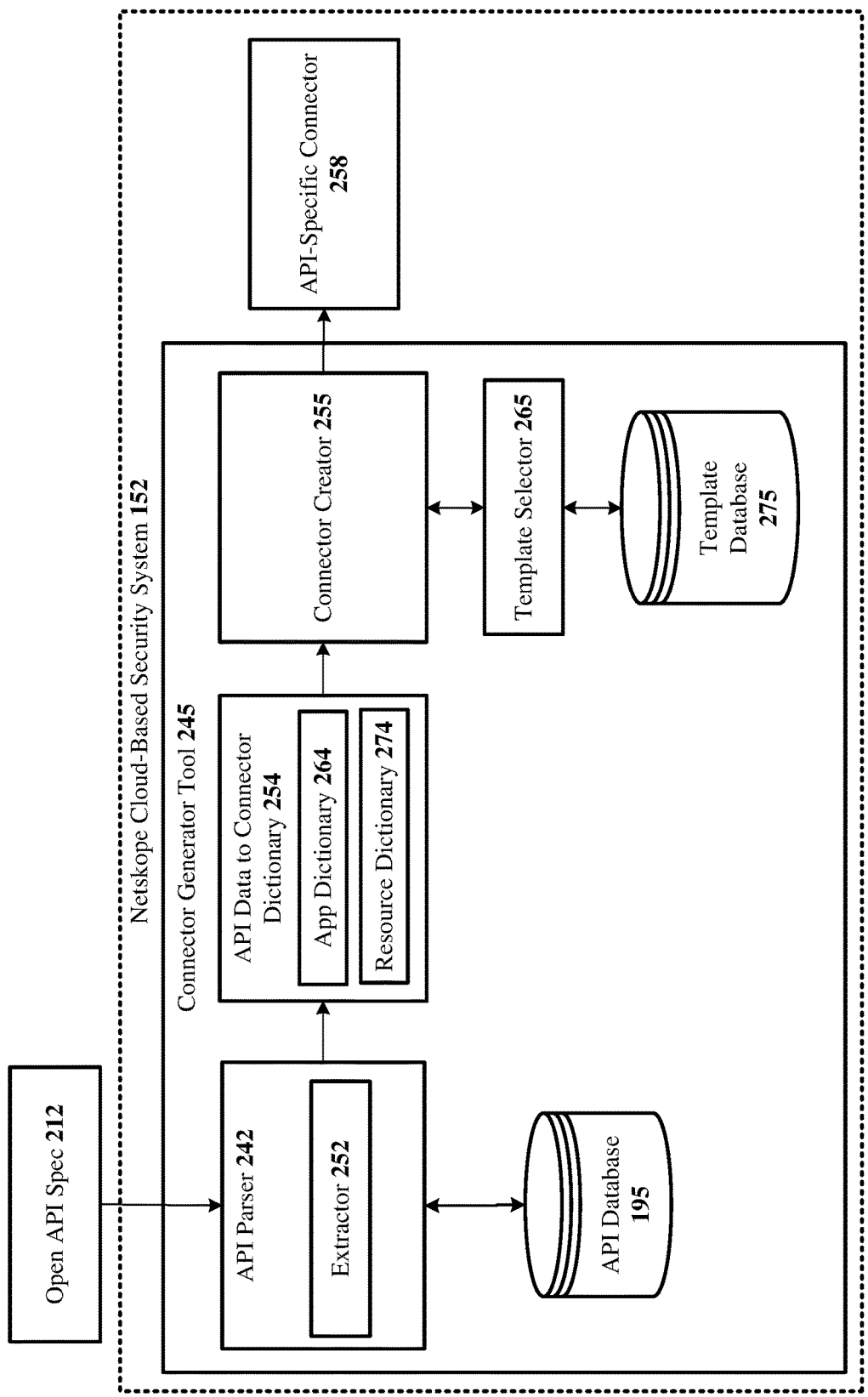
FIG. 2 illustrates a high-level block diagram for generating API-specific connectors, for keeping up with the deployment of APIs, so that SASE protection is afforded.

FIG. 2 illustrates a high-level block diagram of a system 200 for generating API-specific connectors, for keeping up with the deployment of APIs, so that Secure Access Service Edge (SASE) protection is afforded. Netskope Cloud-Based Security System 152 has connector generator tool 245 which in turn has API parser 242 with extractor 252, API data to connector dictionary 254, connector creator 255, template selector 265, template database 275 and API database 195. Connector generator tool 245 generates API-specific connectors 258 that are deep packet inspection (DPI) proxies for providing SASE protection. The DPI proxy is utilized for visibility and policy enforcement, after identifying activities associated with APIs, objects associated with APIs, and data moving activities. An example template file is listed in FIG. 7, FIG. 8, FIG. 9, FIG. 10A and FIG. 10B below.

Users access hundreds to thousands of providers of cloud-based services to generate, store, collaborate and share data with other users inside or outside of the organization. Millions of applications utilize open API specifications 212. An API is a set of programming code that enables data transmission between one software product and another. The Open API specification defines a standard format interface to RESTful APIs which allows both humans and computers to understand the capabilities of the service without looking at the source code or documentation, and without performing network traffic inspection. An Open API is publicly available for developers, who use APIs in many programmatic ways in the development of cloud-based services, such as client libraries, command line interface (CLI) tools and native applications that interact with cloud-based services from vendors such as AWS, Microsoft apps including Azure services, Google apps including GCP services, Box, Slack and Dropbox. The end users can understand and interact with the remote services with a minimal implementation of logic when the API documentation is well-defined. For reference, OpenAPI-Specification, accessed at https://github.com/OAI/OpenAPI-Specification/ on Oct. 14, 2021, provides open API documentation publicly. The APIs of services can also be stored in API database 195.

Continuing the description of system 200, extractor 252 extracts attributes from open API specifications 212, utilizing the structure of open source APIs, as described relative to FIG. 3 below. Open API specifications pulled from the open source repository are converted from YAML to JSON file format in one example, and parsed for storing in API data to connector dictionary 254 in app dictionary 264 and resource dictionary 274, which are described relative to FIG. 4 below. Extracted API attributes are stored in API database 195 and sent to API data to connector dictionary 254. Connector generator tool 245 generates the app connector rule (application signatures) for each API call by understanding the Open API specification for an API family and mapping per-activity attributes that correspond to core activities. The generated application signatures uniquely identify the overall attributes of the API family. API parser 242 identifies resources with respective URIs within the API family and extracts usable attributes of the API resources, useful for building a connector, including per-activity attributes that correspond to core activities that trigger protective actions.

Further continuing the description of the system of FIG. 2, connector generator tool 245 accesses a template for creating connector rules that recognize intercepted API calls and activities requested by the API calls, and that trigger the protective actions. The templates are described relative to an example template listed in FIG. 7, FIG. 8, FIG. 9 and FIG. 10A and FIG. 10B below. Connector generator tool 245 applies the template to the extracted attributes from the API resources to produce the connector rules and stores the connector rules in API-specific connector 258 for use in processing intercepted APIs. API parser 242 identifies the action, and connector creator 255 provides an API-specific connector 258. Inline proxy 162 deploys the API-specific connector 258 as a deep packet inspection (DPI) proxy that provides SASE protection. That is, the application signatures get consumed by the Netskope cloud DPI engine for matching real-time API traffic, identifying the activity—such as create, delete, edit, upload, and download, and extracting fine-grain granular information including file metadata and user details, etc.

Attributes extracted from open API specifications 212 include protocol field (HTTPS & HTTP), server/host maps to domains in the connector, BasePath field that specifies base URI path of the connector resources, title as the application name, paths: dictionary will contain the URI for all the available API(s) for the given service. Further it will contain the HTTP methods DELETE, GET, PUT and POST. Additional attributes include OperationID. The HTTP method dictionary will contain description and OperationID. The value of the OperationID key can be used to identify the activity performed, which is described in more detail below. Parameters field contains "required" key to detect mandatory params, and responses will contain the list of status codes returned by the server.

Figure 3:
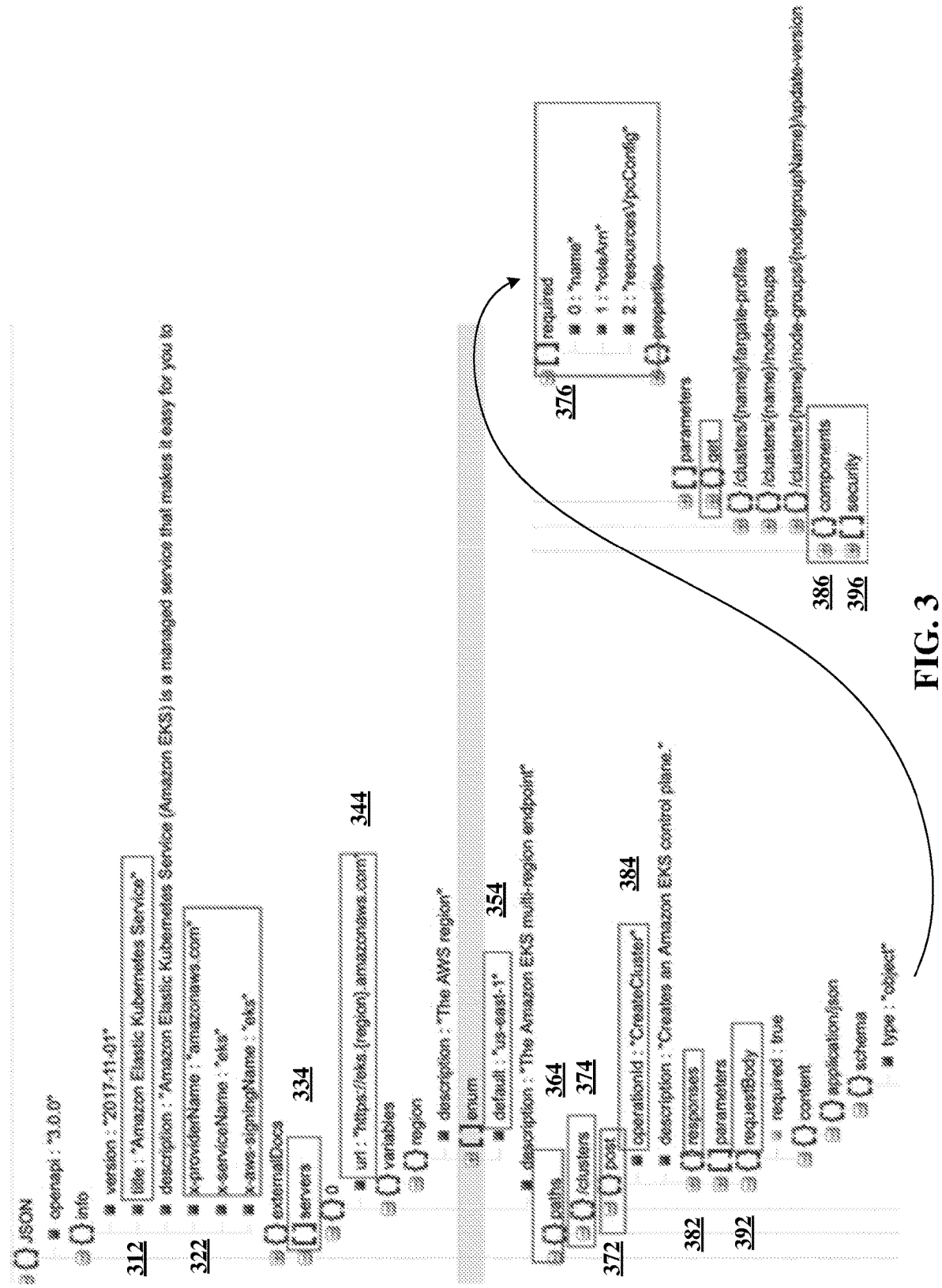
FIG. 3 shows the structure of an example open-source API specification, in JSON, represented in key value pairs, for creating a cluster in AWS.

FIG. 3 shows the structure of an example open-source API specification 212, in JSON, represented in key value pairs, for creating a cluster in AWS. Several sections are described next, highlighting the high-level structure for an AWS API example. The info section specifies the service title: "Amazon Elastic Kubernetes Service" 312, provider name, x-providerName: "amazonaws.com", service name, x-serviceName: "eks" and x-aws-signingName: "eks" 322. The servers section 334 specifies the API server and base URL information, such as servers domain: eks.us-east-1.amazonaws.com, eks.us-east-2.amazonaws.com etc. If the service is using multiple servers or regions, then multiple servers' details will be defined. The API paths are relative to the server URL, url: "https://eks.{region}.amazonaws.com" 344 with the AWS region default: "region us-east-1" 354. The paths 364 define individual endpoints (paths) for each API and the HTTP methods (operations) supported by these endpoints. The API operation includes parameters, request body (if any), possible response status codes and response content; for this example, URL: https://eks.us-east-1.amazonaws.com/clusters 374 and http method: Post 372, with operationId: "CreateCluster" 384. The responses 382 contain the possible HTTP status codes returned by the server and file content if any. The requestBody 392 contains the mandatory and optional parameters in JSON, Mime, post data fields formats and specifies the fields that indicate the data transfer with type: object, required 0: "name", 1: "roleArn" and 2: "resourcesVpcConfig" 376. The request bodies are generally used with "create" and "update" operations (POST, PUT, PATCH). API operation can have parameters passed via URL path, query string and headers. The components section 386 holds a set of reusable objects for different aspects of the Open API Spec. The reusable components are schemas responses, parameters, request bodies, headers, security schemes, callbacks, etc. The security section 396 contains authentication methods used in API. Open API documentation is available in public for 3300+ SaaS/IaaS services.

Figure 4:
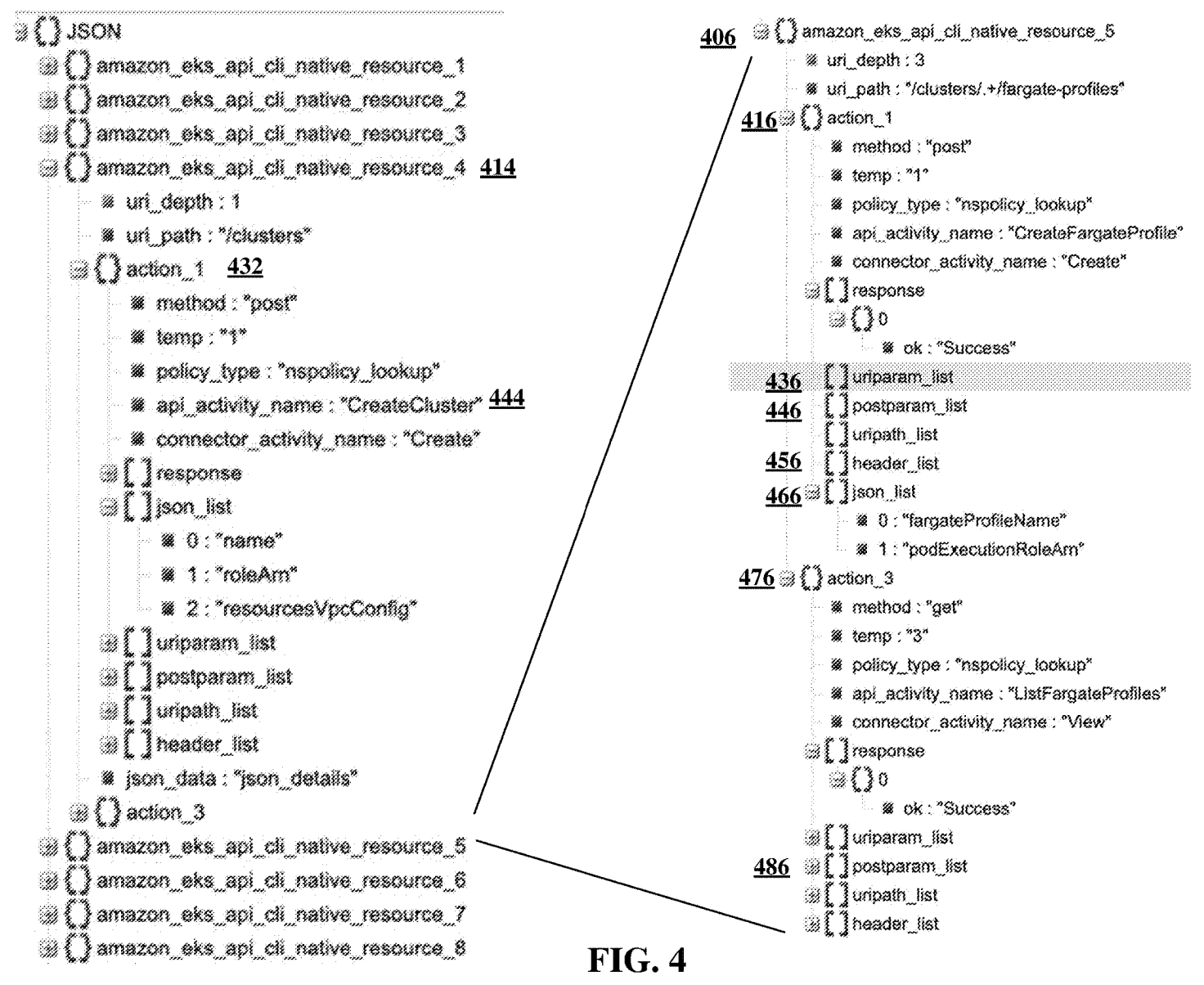

FIG. 4 lists details for API data to connector dictionary 254 for the "Amazon Elastic Kubernetes Service" (AWS) Open API example described above. The FIG. 4 snippet lists the first eight Amazon EKS API CLI native resources, with details expanded for resource dictionary amazon_eks_api_cli_native_resource_4 414, for action 1 432 to create cluster 444. The FIG. 4 snippet also lists details for amazon_eks_api_cli_native_resource_5 406 resource dictionary, which shows post method as action_1 416, with mandatory URI parameters 436, header parameters 456, post data parameters 446, JSON parameters 466, mime parameters, etc. for uniquely identifying the API action 416. The endpoint URLs lists endpoints used to distinguish different activities. Action 3 476 for amazon_eks_api_cli_native_resource_5 406 resource dictionary lists details for a get method, including the postparam_list 486.

FIG. 5 illustrates app dictionary 264 and resource dictionary 274 details. App dictionary 264 stores the information needed to define the application app connector for the API, and includes domain dictionary 502 that stores the domains that are needed for the API, such as eks.us-east-2.amazonaws.com 572, eks.us-east-1.amazonaws.com 552, etc. App dictionary 264 also includes app activities dictionary 505 with application-related activities for creating a cluster such as Create, Register, View, Edit and Delete. App dictionary 264 further includes app name dictionary that has the service name details such as application name "Amazon EKS" 545. FIG. 5 also lists a sample URI parameters list 555 and a sample mime list 508 that contains the required/mandatory MIME parameters to identify the API activity.

FIG. 6 further illustrates the example API data to connector dictionary 254 for the "Amazon Elastic Kubernetes Service" (AWS) Open API example described above, with a snapshot of the first twenty-three entries of the operation ID dictionary 602 for the EKS app. JSON list 606 parameters identify the API activity. Post data dictionary parameters 656 shows the required/mandatory post data parameters to identify the API activity. Some of the APIs are not defined via operation_id in the Open API specification. The following disclosed logic is usable to uniquely identify the operation_id, for situations in which the operation_id is not available in the API.

```
{
/* endpoint is /clusters/{name}/node-groups */
/* http method(post, patch, put, delete,get) */
Extract the last part of the URI that is "node-groups" from the url endpoint information.
Extract the http method that is used by api call.
If http_method is post:
{
Generally the http post method is used for creating an object,
combining the meaning of http method and last part of the uri path.
operation_id = CreateNodegroup
}
elif http_method is patch or put:
{
Generally the http put and patch methods are used for editing a
created object, combining the meaning of method and uri path.
api_action = EditNodegroup
}
elif http_method is delete:
{
Generally the http delete method is used for editing a created
object, combining the meaning of method and uri path.
api_action = DeleteNodegroup
}
elif http_method is get:
{ Generally the http get method is used for listing objects,
combining the meaning of method and uri path.
api_action = ListNodegroup
}
```

```
}
def operation_id_mapping(method,last_part_of_endpoint_url):
if operation_id != defined:
operation_id = (lambda method : 'Create' if (method == 'post')
else ('Edit' if (method == 'put' or method == 'patch') \
else ('View' if (method == 'get' or method == 'head')
else ('Delete' if (method == 'delete') else method))))(method)
operation_id = operation_id + last_part_of_endpoint_url
return operation_id
```

Netskope Cloud-Based Security System 152 currently provides support for more than fifty unique activities via GUI, in one example. The number of APIs displayed depends on the number of activities that are readily supportable for admins to create policies. Additional unique activities can be supported by Netskope Cloud-Based Security System 152. Supported activities are mapped, to support consistency between the API specification and the visualization experience for administrators creating the policies. An example mapping of operation_id vs Netskope core activity is listed next.

| Operation_id | Netskope Activity |
|---|---|
| CreateReplicationSubnetGroup | Create |
| TagResource | Create |
| RemoveEventSource | Delete |
| UntagResource | Delete |
| PutAppsList | Edit |
| PutEncryptionConfig | Edit |
| PutTraceSegments | Edit |
| UpdateSqlInjectionMatchSet | Edit |
| UpdateStreamingDistribution | Edit |
| UpdateWebACL | Edit |
| UpdateXssMatchSet | Edit |
| RegisterEventTopic | Register |
| StartReplicationTask | Start |
| StopReplicationTask | Stop |
| UploadFunction | Upload |
| ListRules | View |
| ListSqlInjectionMatchSets | View |
| ListStreamingDistributions | View |
| ListTagsForResource | View |

The disclosed technology can extract the unique organization id with which admin can create policies to access control between corporate and non-corporate instances. For example: (a) Instance_id for AWS is the account information, (b) instance_id for GCP is project_id, and (c) instance_id for Azure is a subscription. For access key/tokens, the disclosed technology extracts the access key and tokens from the API traffic and use this to derive the instance_id mentioned above. In some implementations, this will not be populated in the events. The service provider field indicates the vendor details of these Open API specifications, in some cases. For example, amazonaws.com, googleapis.com, azure.com, etc. The service domain field indicates the API server domain that is needed to identify the API traffic. For example, eks.ap-southeast-1.amazonaws.com, ec2.eu-central-1.amazonaws.com, compute.googleapis.com, management.azure.com, etc. Endpoint URL is a URL to the target host and is a unique identifier used to locate a resource on the Internet. The disclosed technology extracts the URL information from the API traffic and provides it in the event fields. Examples: (a) eks.ap-southeast-1.amazonaws.com/clusters/.+/addons, (b) eks.ap-southeast-1.amazonaws.com/clusters, (c) eks.ap-southeast-1.amazonaws.com/clusters/.+/fargate-profiles, (d) eks.ap-southeast-1.amazonaws.com/clusters/.+/node-groups. The region consists of multiple, isolated, and physically separate zones within a geographic area. The API traffic has the region details for applicable APIs, so the disclosed technology extracts this information from the API traffic. For example, ap-southeast-1, cn-northwest-1, us-east-2, us-east-1, etc. The file size indicates the size of the file content transferring between client and server. Based on this field, customers can create a policy to block bigger size file uploads or downloads, of various sizes (bytes): 5273, 1260, 1 GB, 2 MB etc. The file type indicates the type of content the file is transferring. Based on the file type, customers can create policies to allow certain types of contents and block certain types of contents. For example, application/octet-stream, text/plain, image/png, etc.

FIG. 7, FIG. 8, FIG. 9, FIG. 10A and FIG. 10B list the template for the activities, including but not limited to upload, download, delete, create, etc. This template gets filled with the data that is extracted from Open API spec 212 and generates the application connectors, aka application signatures. FIG. 7 lists var names, including data center 742, on page one of five or the template in Jinja. FIG. 8 shows triggers 832 and resource name 862, on page two of five of the template, in Jinja. FIG. 9 shows request 942 on page three of five the template, in Jinja. FIG. 10A lists specifics for header in parent_dict 1042, on page four of five of the template, in Jinja. FIG. 10B shows the instance ID 1022 and data center 1032 variable entries on page five, the last page of the template, in Jinja. Each attribute has a single template, and the same template can be utilized across API vendors, such as AWS, GCP and Azure, in one implementation. Jinja, an extensible templating engine, is used in this example, for one implementation of the disclosed technology. Special placeholders in the template allow code similar to Python syntax to be added. A different syntax and template and templating engine can be used in a different implementation.

FIG. 11, FIG. 12, FIG. 13 and FIG. 14 list the resulting connector resource for creating the cluster activity for the AWS create cluster example. Extractor 252 extracts the server domain that is needed for matching real-time API traffic (eks.us-east-1.amazonaws.com) from the Open API specification, to identify the create cluster activity for the real-time create cluster, and extracts the URL to the target host, a unique identifier used to locate a resource. For example, FIG. 11 lists eks.us-east-1.amazonaws.com 1134 on page one the resulting connector resource. FIG. 12 shows the trigger for create 1264, which is on page two the resulting connector resource. FIG. 13 lists Create Cluster 1376 on the third page the resulting connector resource. FIG. 14 lists create trigger 1464 for instance ID, data center and API command, on the last page of the resulting connector resource. This '/clusters' endpoint gets matched with real-time API traffic. Extractor 252 also extracts the HTTP post method that will be matched with real-time API traffic and the mandatory JSON parameters that will be matched with real-time API traffic: name, roleArn 1372, resourcesVpcConfig 1374. Extractor 252 further extracts the response code to check whether the API call is successful or failed (200 Ok or 302 created).

Appendix A lists a complete generated application connector for the Amazon Elastic Kubernetes Service Open API.

Figure 15:
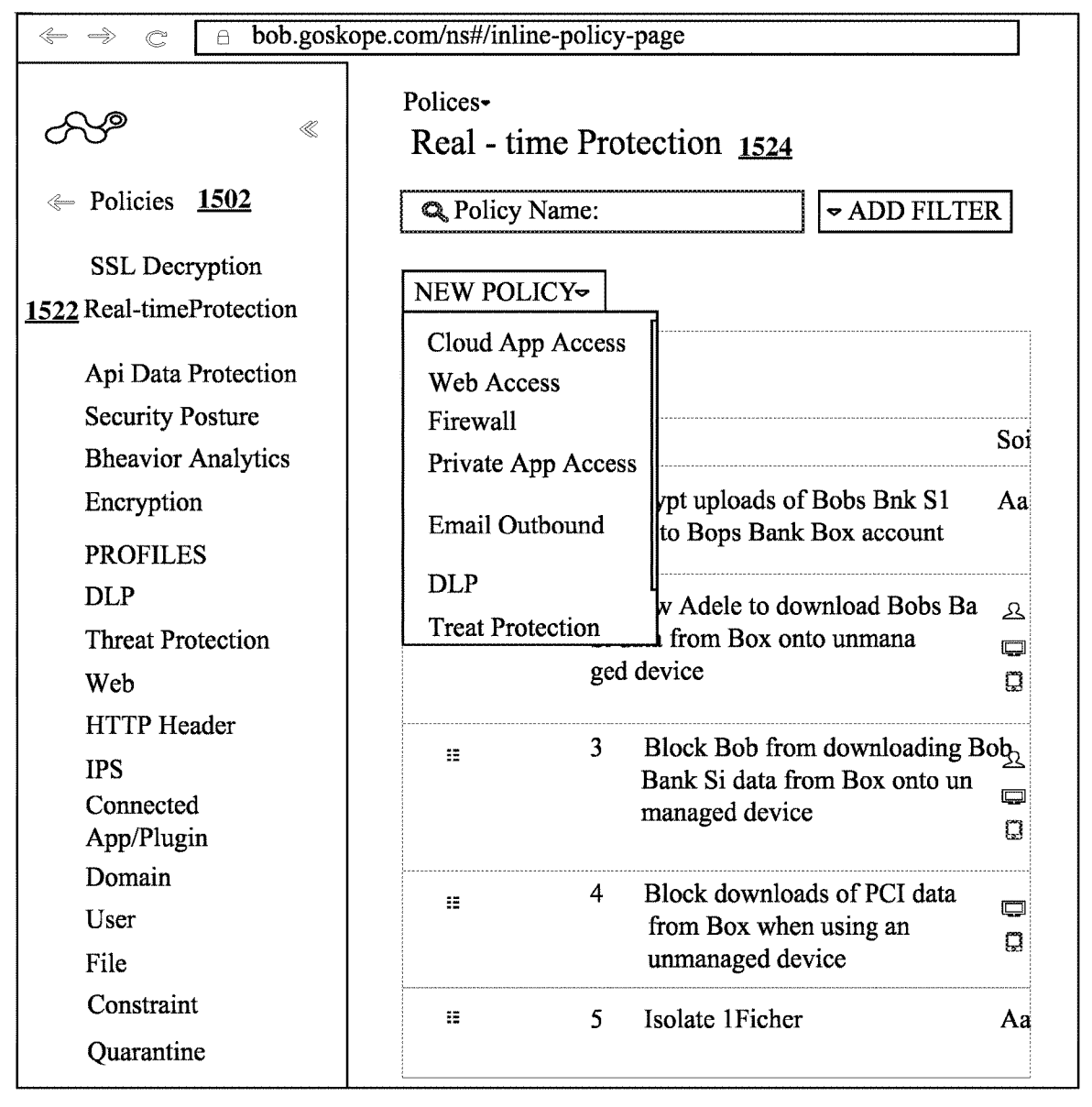

FIG. 15 shows an example graphical user interface (GUI) for visualization and policy setting for open API specs 212, using the disclosed generated connector rules for the APIs. In this example, Admins can go to the Netskope SASE screen, then select Policies 1502, then select real-time protection 1522 and use the dropdown menu to set up a new policy 1524.

FIG. 16 shows the real-time protection policy 1604 UI for setting profile and action 1664 and to set policy 1674 for the generated connector rules for the Amazon EKS 1644 example described above. The settings enable the Netskope cloud-based security system 152 to specify policy enforcement and visibility to protect their sensitive data, as described in the use cases below.

Figure 17:
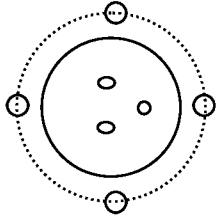
FIG. 17 shows a UI usable to select activities and constraints, based on the generated connector rules for the Amazon EKS.

FIG. 17 shows a UI usable to select activities and constraints 1714, based on the generated connector rules for the Amazon EKS, of the example. Admins can use this UI to select activities 1722 and then set constraints 1724 for the selected activities.

A sample event, an AWS EKS cluster creation API action, is listed next for activity create cluster, for app Amazon EKS. The disclosed generated connection rules are deployed for processing the intercepted event.

```
tenantid=1016 user-'venkat@netskope.com' {
    "_category_id": "14",
    "_category_tags": ["564","14"],
    "_content_version": 1626409604,
    "_nshostname": "proxy-dev02",
    "_resource_name": "resource_13",
    "_session_begin": "1",
    "_skip_geoip_lookup": "yes",
    "_src_epoch_now": 0,
    "access_method": "Client",
    "activity": "Create",
    "api action": "CreateCluster",
    "alert": "Block/User Alert",
    "app": "Amazon EKS",
    "app_session_id": "22813315841154897 65",
    "appsuite": "Amazon",
    "browser": "Native",
    "browser_session_id": "6063472628009069822,
    "connection_id": "6445013418787561624,
    "count": 1,
    "device": "Mac Device",
    "device_classification": "not configured",
    "dst_latitude": 0.0,
    "dst_location": "N/A",
    "dst_longitude": 0.0,
    "dst_timezone": "N/A",
    "dstip": "172.16.178.192",
    "hostname": "Venkat's MacBook Pro",
    "instance_id": "086760228850",
    "managed_app": "yes",
    "netskope_pop": "NSKP-STARFISH",
    "os": "Catalina",
    "os_version": "Catalina",
    "page": "eks.us-east-1.amazonaws.com",
    "page_site": "Amazon EKS",
    "protocol": "HTTP/1.1",
    "site": "Amazon EKS",
    "src_latitude": 0.0,
    "src_location": "N/A",
    "src_longitude": 0.0,
    "src_time": "N/A",
    "src_timezone": "N/A",
    "srcip": "10.50.0.244",
```

-continued

```
    "sv": "unknown",
    "telemetry_app": "",
    "timestamp": 1626620052,
    "traffic_type": "CloudApp",
    "transaction_id": 11439194405520120 32,
    "type": "nspolicy",
    "url": "eks.us-east-1.amazonaws.com/clusters",
    "user": "venkat@netskope.com",
    "userip": "10.50.0.244"
}
```

The disclosed technology enables developers who are using open API specs to gain the ability to specify policy enforcement and visibility to protect their sensitive data using disclosed generated API-specific connectors using the GUI, as described above. The following use cases describe results achieved via the disclosed generated app connectors.

In one case, the disclosed API-specific connectors limit access to sanctioned instances with policy controls, and in another case, provide limited access to the authorized users of sanctioned instances, which results in reduced misconfiguration. The disclosed app connectors also support identifying sensitive actions being performed by users on sanctioned instances and enforcing policies, as well as deleting or editing security-related policies.

In another use case, the disclosed methods of keeping up with the deployment of APIs supports the ability to identify anomalous activities, and to apply UEBA to real-time activity events, with multiple delete operations in a short duration.

A further use case includes detection of data exfiltration, and the ability to apply an API-specific DLP profile to monitor unsanctioned traffic for data exfiltration detection and blocking. Yet other use cases include threat protection, with malware inspection of transit traffic to both sanctioned and unsanctioned instances.

The disclosed technology for creating connectors (also referred to as parsers) also makes it possible for customers, such as app developers, to upload their APIs for processing when they are overhauling their legacy applications. Then their tenant can open their API and readily gain visibility into vulnerabilities.

In one example implementation, the disclosed technology generated API-specific connectors for two hundred fifty Amazon Web Services that consist of more than nine thousand five hundred API calls.

Computer System

Figure 18:
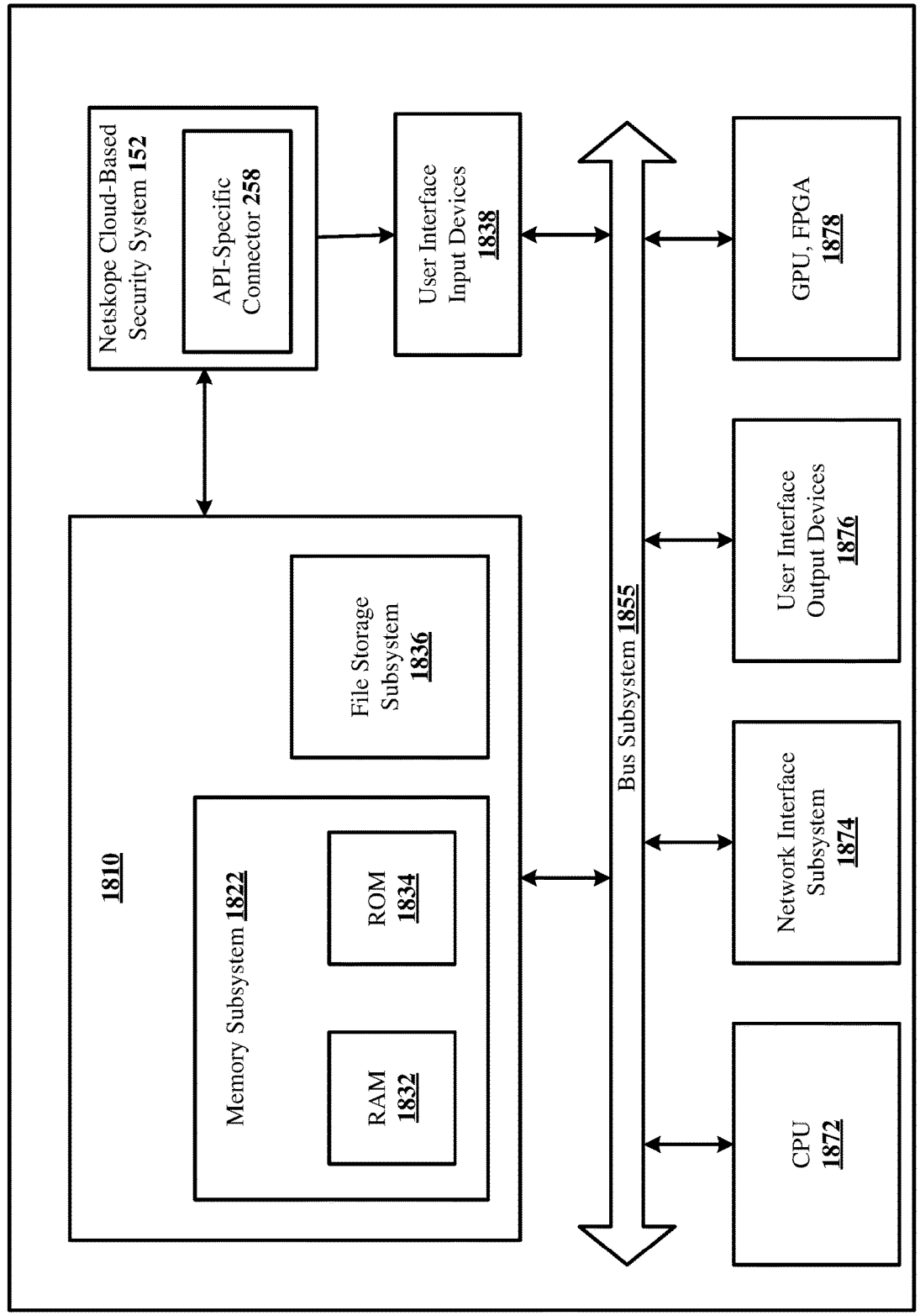
FIG. 18 is a simplified block diagram of a computer system that can be used for keeping up with the deployment of APIs, so that Secure Access Service Edge (SASE) protection is afforded, in accordance with an implementation of the disclosed technology.

FIG. 18 is a simplified block diagram of a computer system 1800 that can be used for keeping up with the deployment of APIs, so that Secure Access Service Edge (SASE) protection is afforded. Computer system 1800 includes at least one central processing unit (CPU) 1872 that communicates with a number of peripheral devices via bus subsystem 1855, and Netskope Cloud-Based Security System 152 with API-Specific Connectors 258 for providing network security services described herein. These peripheral devices can include a storage subsystem 1810 including, for example, memory devices and a file storage subsystem 1836, user interface input devices 1838, user interface output devices 1876, and a network interface subsystem 1874. The input and output devices allow user interaction with computer system 1800. Network interface subsystem 1874 provides an interface to outside networks, including an interface to corresponding interface devices in other computer systems.

In one implementation, Netskope Cloud-Based Security System 152 with API-Specific Connectors 258 of FIG. 2 is communicably linked to the storage subsystem 1810 and the user interface input devices 1838.

User interface input devices 1838 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1800.

User interface output devices 1876 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1800 to the user or to another machine or computer system.

Storage subsystem 1810 stores programming and data constructs that provide the functionality of some or all of the modules and methods described herein. Subsystem 1878 can be graphics processing units (GPUs) or field-programmable gate arrays (FPGAs).

Memory subsystem 1822 used in the storage subsystem 1810 can include a number of memories including a main random access memory (RAM) 1832 for storage of instructions and data during program execution and a read only memory (ROM) 1834 in which fixed instructions are stored. A file storage subsystem 1836 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1836 in the storage subsystem 1810, or in other machines accessible by the processor.

Bus subsystem 1855 provides a mechanism for letting the various components and subsystems of computer system 1800 communicate with each other as intended. Although bus subsystem 1855 is shown schematically as a single bus, alternative implementations of the bus subsystem can use multiple busses.

Computer system 1800 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1800 depicted in FIG. 18 is intended only as a specific example for purposes of illustrating the preferred embodiments of the present invention. Many other configurations of computer system 1800 are possible having more or less components than the computer system depicted in FIG. 18.

Particular Implementations

Some implementations and features for keeping up with the deployment of APIs, so that Secure Access Service Edge (SASE) protection is afforded are described in the following discussion.

In one implementation, a disclosed method of keeping up with the deployment of APIs, so that Secure Access Service Edge (SASE) protection is afforded includes parsing an OpenAPI specification for an API family: identifying overall attributes of the API family, identifying resources with respective URIs within the API family, and extracting usable attributes of the API resources, useful for building a connector, including extracting per-activity attributes that correspond to core activities that trigger protective actions. The disclosed method also includes applying a connector creator that performs actions including accessing a template for creating connector rules that recognize intercepted API calls and activities requested by the API calls, and that trigger the protective actions, using the template and the extracted attributes from the API resources, producing the connector rules, and storing the connector rules for use in processing intercepted APIs.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

Some implementations of the disclosed method include deploying the connector rules in deep packet inspection (DPI) proxies for processing the intercepted APIs.

One implementation of the disclosed method further includes determining to use the connector rules based on a domain name in a uniform resource identifier (URI) used to access the API.

Many implementations of the disclosed method include an operation identifier key usable to identify activities requested by the API calls. Some also include combining uniform resource locator (URL) endpoint information and at least part of a URI for an API call to create an alternate operation identifier usable to identify activities requested by the API call.

For some implementations of the disclosed method the API family includes one of Amazon Web Services (AWS), Google Cloud Platform (GCP) and Microsoft Azure. The API family can also include Alibaba Open Platform which provides partners with raw materials, such as API, account system and data security; IBM Cloud® platform which combines platform as a service (PaaS) with infrastructure as a service (IaaS) to provide an integrated experience; and Oracle Cloud which supports flexible multi-cloud deployments and meets specific industry requirements for government, financial services, and other industries; as well as private clouds of organizations.

In one implementation of the disclosed method, the extracted usable attributes include a protocol field value, server domain and a base URI path of connector resources.

Other implementations of the methods described in this section can include a tangible non-transitory computer readable storage medium storing program instructions loaded into memory that, when executed on processors cause the processors to perform any of the methods described above. Yet another implementation of the methods described in this section can include a device including memory and one or more processors operable to execute computer instructions, stored in the memory, to perform any of the methods described above.

Any data structures and code described or referenced above are stored according to many implementations on a computer readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A method of building connectors that trigger protective actions during API calls including:
    parsing an OpenAPI specification to identify resources and extract attributes of API resources usable to build a connector or an application signature, including attributes of core activities that trigger protective actions;
    wherein the OpenAPI specification describes an interface to an API of a service, which allows computers to understand the capabilities of the service without looking at source code or documentation of the service, and without inspecting traffic of the service;
    applying a connector creator that performs actions to generate connector rules or application signatures, the actions including mapping per-activity attributes, and accessing a template for creating application signatures or connector rules that recognize intercepted API calls and activities requested by the API calls; and
    using the attributes with the template to produce the connector rules, thereby automating building the connectors or application signatures.

2. The method of claim 1, further including deploying connector rules in deep packet inspection (DPI) proxies for processing of intercepted APIs.

3. The method of claim 1, further including determining to use connector rules based on a domain name in a uniform resource identifier (URI) used to access an API described by the OpenAPI specification.

4. The method of claim 1, wherein a generated connector is configured to interface with at least one of infrastructure-as-a-service (IaaS), platform-as-a-service (PaaS), or software-as-a-service (SaaS).

5. The method of claim 4, further including combining uniform resource locator (URL) endpoint information and at least part of a uniform resource identifier (URI) for an API call to create an alternate operation identifier usable to identify activities requested by the API call.

6. The method of claim 1, further including an operation identifier key usable to identify activities requested by API calls.

7. The method of claim 1, wherein an API family described by the OpenAPI specification includes one of Amazon Web Services (AWS), Google Cloud Platform (GCP), Microsoft Azure, Alibaba Open Platform, IBM Cloud Platform and Cloud Oracle Platform.

8. A tangible non-transitory computer readable storage medium, including program instructions loaded into memory that, when executed on processors, cause the processors to implement a method of building connectors that trigger protective actions during API calls, including:
    parsing an OpenAPI specification to identify resources and extract attributes of API resources usable to build a connector or an application signature, including attributes of core activities that trigger protective actions;
    wherein the OpenAPI specification describes an interface to an API of a service, which allows computers to understand the capabilities of the service without looking at source code or documentation of the service, and without inspecting traffic of the service;
    applying a connector creator that performs actions to generate connector rules or application signatures, the actions including mapping per-activity attributes, and accessing a template for creating application signatures or connector rules that recognize intercepted API calls and activities requested by the API calls; and
    using the attributes with the template to produce the connector rules, thereby automating building the connectors or application signatures.

9. The tangible non-transitory computer readable storage medium of claim 8, further including deploying connector rules in deep packet inspection (DPI) proxies for processing of intercepted APIs.

10. The tangible non-transitory computer readable storage medium of claim 8, further including determining to use connector rules based on a domain name in a uniform resource identifier (URI) used to access an API.

11. The tangible non-transitory computer readable storage medium of claim 10, wherein the API is described by the OpenAPI specification.

12. The method of claim 11, further including combining uniform resource locator (URL) endpoint information and at least part of a uniform resource identifier (URI) for an API call to create an alternate operation identifier usable to identify activities requested by the API call.

13. The tangible non-transitory computer readable storage medium of claim 8, further including an operation identifier key usable to identify activities requested by API calls.

14. The tangible non-transitory computer readable storage medium of claim 8, wherein an API family described by the OpenAPI specification includes one of Amazon Web Services (AWS), Google Cloud Platform (GCP), Microsoft Azure, Alibaba Open Platform, IBM Cloud Platform and Cloud Oracle Platform.

15. A device including a processor, memory coupled to the processor, and computer instructions loaded into the memory that, when executed, cause the processor to implement a process of building connectors that trigger protective actions during API calls that includes:
    parsing an OpenAPI specification to identify resources and extract attributes of API resources usable to build a connector or an application signature, including attributes of core activities that trigger protective actions;
    wherein the OpenAPI specification describes an interface to an API of a service, which allows computers to understand the capabilities of the service without looking at source code or documentation of the service, and without inspecting traffic of the service;
    applying a connector creator that performs actions to generate connector rules or application signatures, the actions including mapping per-activity attributes, and accessing a template for creating application signatures or connector rules that recognize intercepted API calls and activities requested by the API calls; and using the attributes with the template to produce the connector rules, thereby automating building the connectors or application signatures.

16. The device of claim 15, further including deploying connector rules in deep packet inspection (DPI) proxies for processing of intercepted APIs.

17. The device of claim 15, further including determining to use connector rules based on a domain name in a uniform resource identifier (URI) used to access an API described by the OpenAPI specification.

18. The device of claim 15, further including an operation identifier key usable to identify activities requested by API calls.

19. The device of claim 18, further including combining uniform resource locator (URL) endpoint information and at least part of a uniform resource identifier (URI) for an API call to create an alternate operation identifier usable to identify activities requested by the API call.

20. The device of claim 15, wherein an API family described by the OpenAPI specification includes one of Amazon Web Services (AWS), Google Cloud Platform (GCP), Microsoft Azure, Alibaba Open Platform, IBM Cloud Platform and Cloud Oracle Platform.

* * * * *